US007830556B2

(12) United States Patent
Sakai et al.

(10) Patent No.: US 7,830,556 B2
(45) Date of Patent: Nov. 9, 2010

(54) INFORMATION PROVIDING SYSTEM

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 11/682,122

(22) Filed: Mar. 5, 2007

(65) Prior Publication Data
US 2007/0146797 A1 Jun. 28, 2007

Related U.S. Application Data

(63) Continuation of application No. PCT/JP2004/013674, filed on Sep. 17, 2004.

(51) Int. Cl.
H04N 1/40 (2006.01)

(52) U.S. Cl. .................. 358/3.28; 358/468

(58) Field of Classification Search ........ 358/3.28, 358/1.9, 2.1, 1.15, 1.18, 468
See application file for complete search history.

(56) References Cited

U.S. PATENT DOCUMENTS

| 4,893,333 | A | | 1/1990 | Baran et al. | |
|---|---|---|---|---|---|
| 5,075,787 | A | * | 12/1991 | Shaughnessy et al. | 358/452 |
| 5,138,465 | A | * | 8/1992 | Ng et al. | 358/453 |
| 2002/0170970 | A1 | | 11/2002 | Ehrhart | |
| 2002/0185537 | A1 | | 12/2002 | Konda | |
| 2003/0040931 | A1 | | 2/2003 | De Mol Van Otterloo et al. | |
| 2004/0059779 | A1 | | 3/2004 | Philyaw | |

FOREIGN PATENT DOCUMENTS

| JP | 2001-325219 | 11/2001 |
|---|---|---|
| JP | 2002-140245 | 5/2002 |
| JP | 2003-150437 | 5/2003 |
| JP | 2004-38442 | 2/2004 |
| JP | 2004-509393 | 3/2004 |
| WO | 00/60484 | 10/2000 |
| WO | WO 02/21794 A2 | 3/2002 |

OTHER PUBLICATIONS

International Search Report mailed on Dec. 28, 2004 for International Application PCT/JP2004/013674.
Partial English Translation of JP 2002-140245, col. 7, line 40 through col. 9, line 14, and col. 10, lines 27-44.
Partial English Translation of JP 2001-325219, paragraphs [0038]-[0042].
Japanese Office Action mailed Jul. 14, 2009 and issued in corresponding Japanese Patent Application 2006-535005.
European Office Action dated Aug. 20, 2009, issued in corresponding European Patent Application 04 733 293.8.

* cited by examiner

*Primary Examiner*—Thomas D Lee
*Assistant Examiner*—Stephen M Brinich
(74) *Attorney, Agent, or Firm*—Fujitsu Patent Center

(57) ABSTRACT

The information providing system according to the present invention comprises: a code transmission unit that can transmit an image acquired by reading the image that is printed on the print medium and in which the code is embedded, or can transmit the code extracted from the acquired image; an information providing unit that receives the acquired image, or the code extracted from the acquired image, and transmits information corresponding to the image or information used for acquiring the information corresponding to the image; an image receiving/acquiring unit that receives the information corresponding to the image, or receives the information used for acquiring the information corresponding to the image and can acquire the information corresponding to the image; and an information changing unit that can change the information corresponding to the image in the information providing unit.

6 Claims, 10 Drawing Sheets

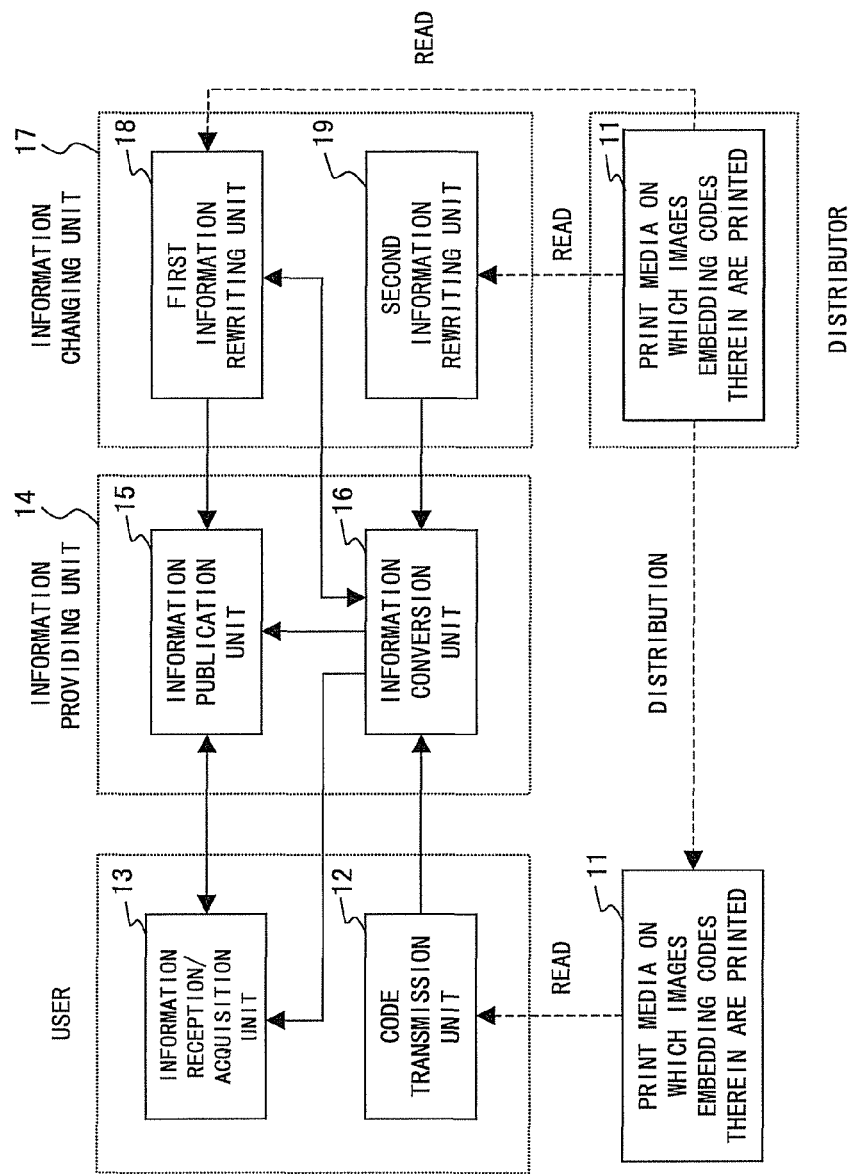
F I G. 1

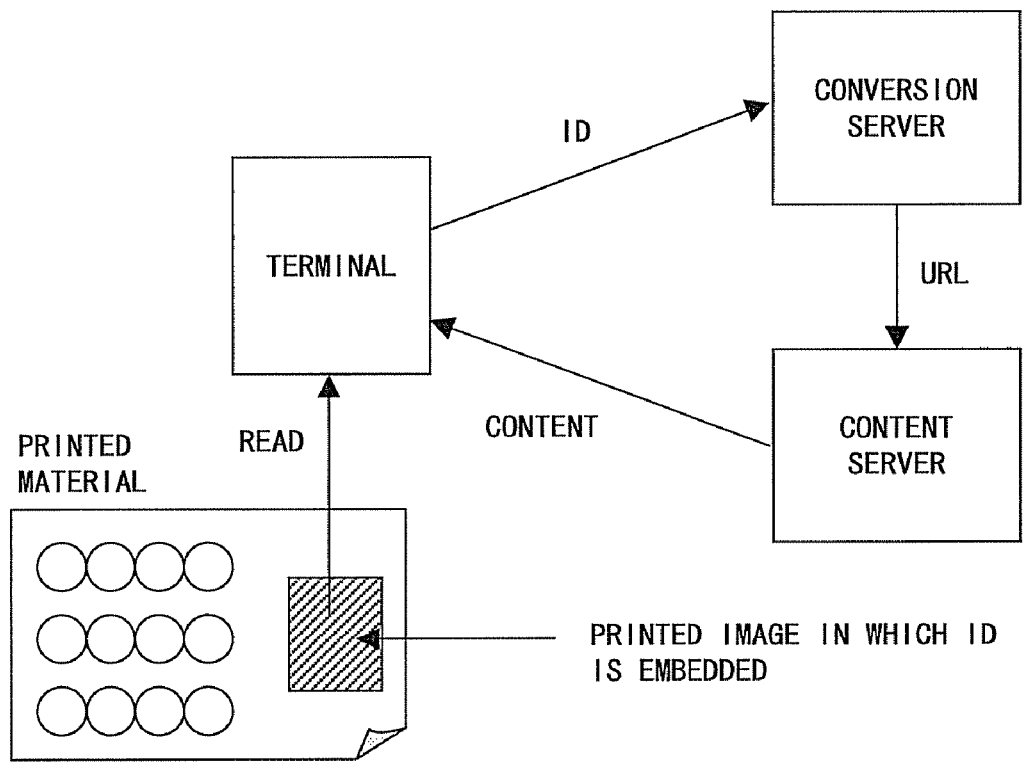
F I G. 2 A

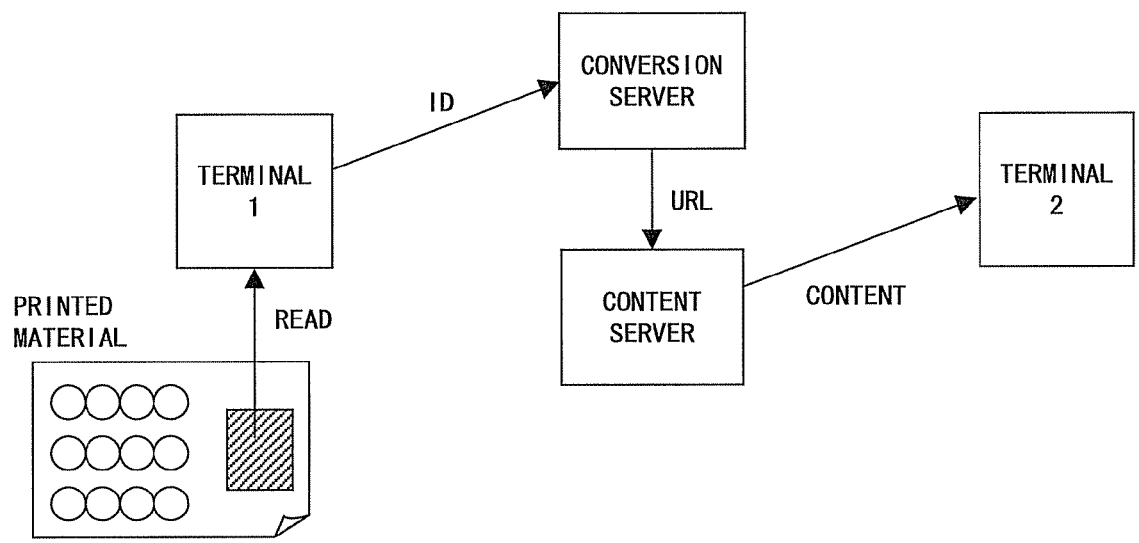
F I G. 2 C

| ID#1 | URL#1 |
|------|-------|
| ID#2 | URL#2 |
| ... | ... |
| ID#N | URL#N |

F I G. 3

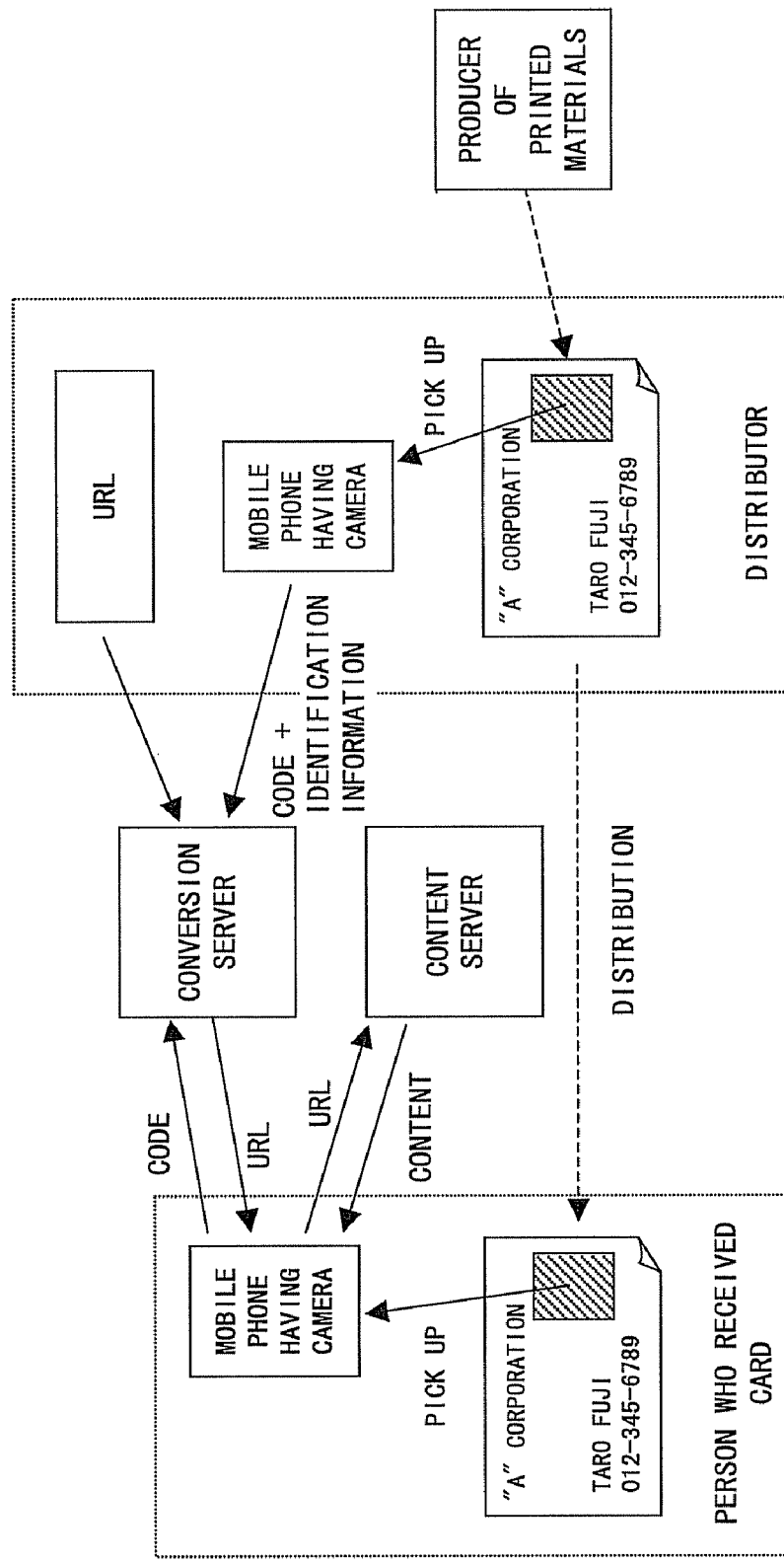
F I G. 5

INFORMATION PROVIDING SYSTEM

CROSS REFERENCE TO RELATED APPLICATION

This application is a continuation of an international PCT application No. PCT/JP2004/013674, which was filed on Sep. 17, 2004.

BACKGROUND OF THE INVENTION

1. Field of the Invention

The present invention relates to an information providing system that accesses information (content) corresponding to codes by using images that are printed on print media and in which the codes are embedded, and particularly to an information providing system that realizes access to different content by using one and the same printed image.

2. Description of the Related Art

Conventionally, various codes such as those listed below are used as codes printed on print media, or codes embedded in images printed on print media.

Two-dimensional codes (such as QR codes) printed on print media can include not only IDs, but also information (such as URLs) used for acquiring content because they can carry a much greater amount of data than one-dimensional codes or electronic watermarks (QR codes can carry approximately 4300 alphanumeric characters). Thus, by reading the QR code and acquiring the URL, the content can be accessed directly by using the URL. However, the coded images that are printed on the media are not readable by human beings, and therefore the areas in which the coded images will be found need to be maintained on the media.

Electronic watermarks do not require the existence of areas that are not readable as the two-dimensional codes described above, such as QR codes. However, the electronic watermark cannot carry as much information as the two-dimensional code (it can only carry up to a ten-digit number) because electronic watermarks are embedded in images on the print media. Accordingly, usually only IDs are embedded in the electronic watermarks. For example, the IDs are extracted from the electronic watermarks, the IDs are transmitted to a conversion server, the information for acquiring the content corresponding to the IDs such as URLs is received from the conversion server, and access to the content is made by using the received information.

Patent Document 1 discloses the information providing system using the two-dimensional codes in which people that have received business cards made of paper can acquire electronic personal information on the owner of the business card via the network by reading the codes printed on the business card with a code reader.

Patent Document 2 discloses the information providing system using electronic watermarks in which IDs are embedded in advertisement images by using electronic watermarks, the advertisement images including the IDs are transmitted to servers managing advertisement information from terminals, and the servers receive the transmitted advertisement images and transmit to the terminals advertisement information corresponding to the advertisement images.

Patent Document 1

Japanese Patent Application Publication No. 2004-38442 "Data operating apparatus and its method"

Patent Document 2

Japanese Patent Application Publication No. 2003-150437 "Advertisement information registration method, advertisement information providing method, access information providing method, registration terminal, access information acquiring terminal/server, advertisement information referring terminal, and advertisement information providing system"

However, in the technique in which codes are embedded in printed images on print media as in the Patent Document 2, there is a problem in which it is impossible to change information corresponding to the codes that are fixed values. Specifically, once information corresponding to a printed image is changed for any reason, users that use the printed image cannot access different information (content) e.g., the users cannot access changed information (content) via the printed image.

It is an object of the present invention to provide an information providing system that can access different content through an image that is printed on a print medium and in which a code is embedded.

SUMMARY OF THE INVENTION

An information providing system according to the present invention is an information providing system for receiving or acquiring information corresponding to an image in which a code is embedded by using a print medium on which the image including the code embedded therein is printed, comprising: a code transmission unit that can transmit an image acquired by reading the image that is printed on the print medium and in which the code is embedded or the code extracted from the read and acquired image; an information providing unit that receives the read and acquired image, or the code extracted from the read and acquired image, and transmits information corresponding to the image or information used for acquiring the information corresponding to the image; an image receiving/acquiring unit that receives the information corresponding to the image, or receives the information used for acquiring the information corresponding to the image and can acquire the information corresponding to the image on the basis of the information that is used for the acquisition; and an information changing unit that can change the information corresponding to the image in the information providing unit.

In the above configuration, by using the information changing unit, it is possible to change information (content) corresponding to an image that is printed on the print medium and in which the code is embedded, and to access different content such as, for example, the latest content that corresponds to the printed image.

According to the present invention, it is possible to change content that is to be acquired by using an image that is printed on the print media and in which the code is embedded even after the print media are distributed. In the case of business cards, for example, even when the contact information (such as the company's name, the section, and the like) of the owners of the business cards is changed after the distribution of the business cards, the people who have received the business cards can acquire the latest contact information because the new contact information is provided as the content.

Also, according to the present invention, it is possible to identify content corresponding to embedded code(s) in a simple manner because the change in the content to be provided is carried out in the registration terminal by reading image(s) on the print medium identical to the distributed print medium. For registration operations, for example, operators do not have to handle URLs for acquiring codes or content, and can change content using, as interfaces, image(s) that can be visually and intuitively understood.

BRIEF DESCRIPTION OF DRAWINGS

FIG. 1 shows a principle configuration of an information providing system according to the present invention;

FIG. 2A is the first view showing exchanges of information between a user terminal and the information providing unit, beginning from reading image(s) in which ID(s) is/are embedded to acquiring content;

FIG. 2C is the third view showing exchanges of information between a user terminal and the information providing unit, beginning from reading image(s) in which ID(s) is/are embedded to acquiring content;

FIG. 3 shows an ID-URL conversion table;

FIG. 5 shows an example in which the information providing system according to the present invention is applied in the case in which the printed materials that are distributed are business cards.

DESCRIPTION OF THE PREFERRED EMBODIMENTS

Figure 2B:
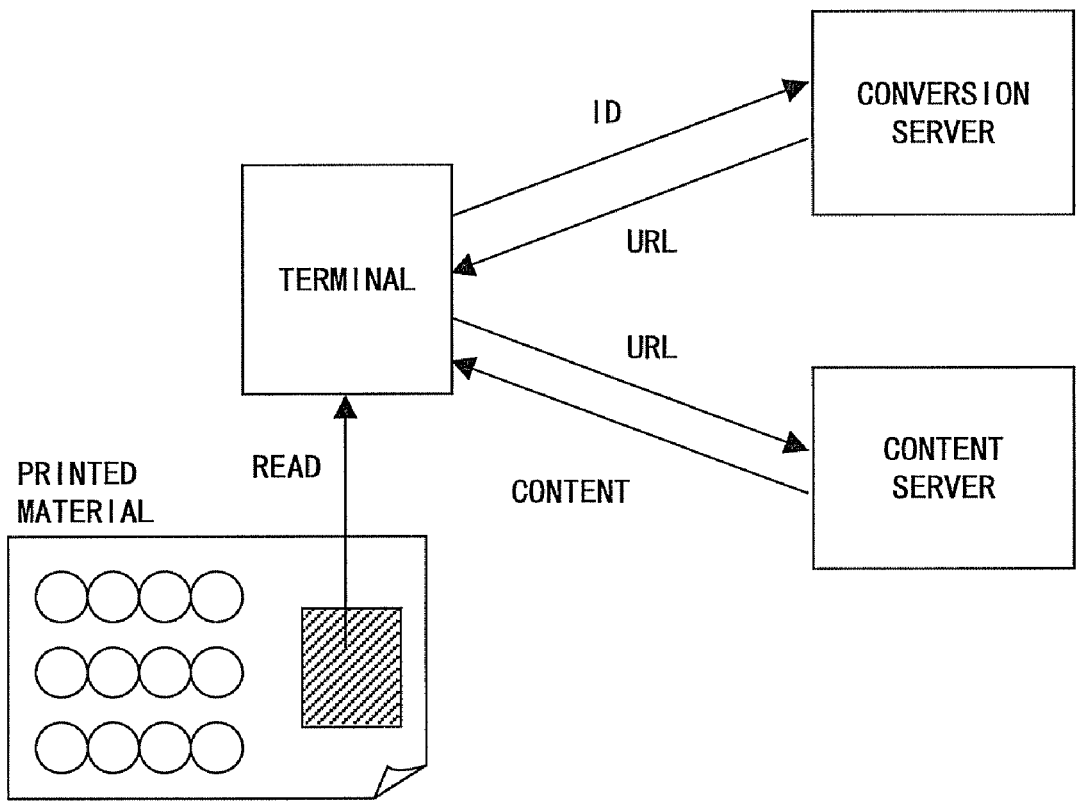
FIG. 2B is the second view showing exchanges of information between a user terminal and the information providing unit, beginning from reading image(s) in which ID(s) is/are embedded to acquiring content.

Hereinafter, embodiments of the present invention will be explained in detail by referring to the drawings.

FIG. 1 shows a principle configuration of an information providing system according to the present invention.

The information providing system shown in FIG. 1 receives or acquires information corresponding to printed images in which codes are embedded by using print media 11 on which images embedding codes therein are printed.

In FIG. 1, the information providing system includes a code transmission unit 12 that can transmit image(s) obtained by reading image(s) that is/are printed on the print media 11 and in which code(s) is/are embedded, or can transmit the code(s) extracted from the read and acquired image(s); an information providing unit 14 that receives the read and acquired image(s) or the code(s) extracted from the read and acquired image(s), and that transmits information corresponding to the read and acquired image(s) or information used for acquiring the information corresponding to the read and acquired image(s); an information reception/acquisition unit 13 that receives the information corresponding to the read and acquired image(s), or that receives the information used for acquiring the information corresponding to the read and acquired image(s) and can acquire the information corresponding to the read and acquired image(s) on the basis of the information used for acquiring the information; and an information changing unit 17 that can change the information corresponding the read and acquired image(s) in the information providing unit 14.

The information providing unit 14 includes an information conversion unit 16 that receives the read and acquired image (3) or the code(s) extracted from the read and acquired image(s), and that transmits to a transmission destination information (such as a URL or the like) used for acquiring the information corresponding to the read and acquired image(s); and an information publication unit 15 that receives the information used for acquiring the information corresponding to the read and acquired image(s) from the information conversion unit 16 or the like, and that transmits to a transmission destination the information corresponding to the read and acquired image(s).

Figure 3:
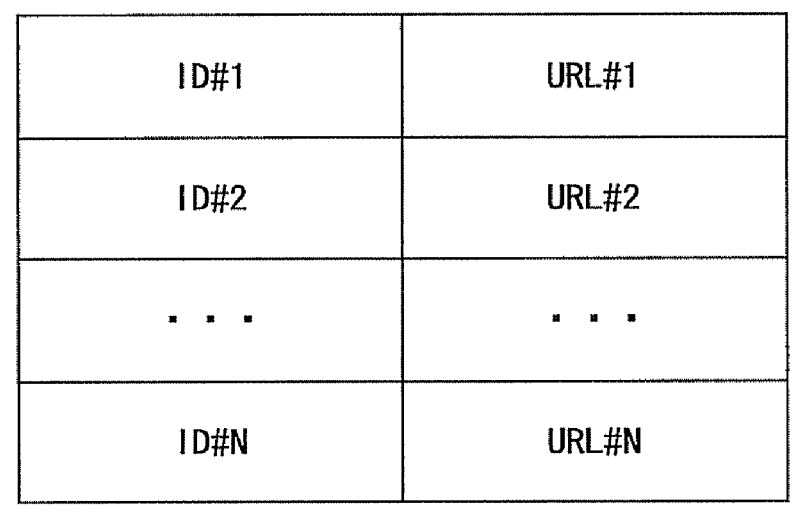

The information changing unit 17 includes a first information rewriting unit 18 that reads from the print media 11 image(s) that is/are printed on the print media 11 and in which code(s) is/are embedded, transmits to the information conversion unit 16 the read image(s) or the code(s) extracted from the read image(s), acquires information used for acquiring the information corresponding to the read image(s), and transmits to the information publication unit 15 the information used for acquiring the information corresponding to the read image(s) together with new content that is meant to be associated with the read image(s). The information changing unit 17 also includes a second information rewriting unit 19 that reads from the print media 11 image(s) that is/are printed on the print media 11 and in which code(s) is/are embedded, and that transmits to the information conversion unit 16 the read image(s) or the code(s) extracted from the read image(s) together with the information used for acquiring the newly specified information corresponding to the read image(s). The second information rewriting unit 19 transmits to the information conversion unit 16 information that contains instructions to rewrite into the specified information the information of, for example, a URL corresponding to an ID in the ID-URL conversion table shown in FIG. 3.

The information changing unit 17 may consist of the functions of both the first information rewriting unit 18 and the second information rewriting unit 19, or also may consist of either one of the above functions.

FIGS. 2A through 2D show exchanges of information between a user terminal and the information providing unit, beginning from reading image(s) in which ID(s) is/are embedded to acquiring content.

Figure 2D:
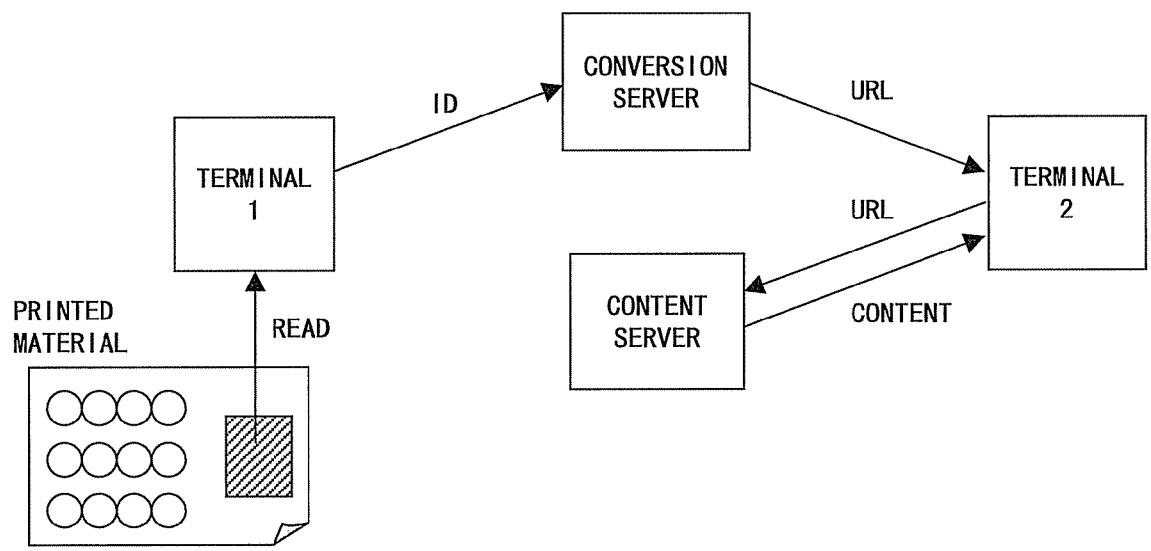
FIG. 2D is the fourth view showing exchanges of information between a user terminal and the information providing unit, beginning from reading image(s) in which ID (s) is/are embedded to acquiring content.

In FIGS. 2A through 2D, the user terminal corresponds to the code transmission unit 12 and the information reception/acquisition unit 13 in FIG. 1. FIG. 2A and FIG. 2B show examples in which the terminal that receives content information is identical to the terminal that transmits the ID (code). FIG. 2C and FIG. 2D show examples in which the terminal that receives content information differs from the terminal that transmits the ID (code).

The conversion server corresponds to the information conversion unit 16 in FIG. 1. The content server corresponds to the information publication unit 15 in FIG. 1. In the present embodiment, a URL (Uniform Resource Locator) is used as information used for acquiring content on the basis of an ID (code). The conversion server converts the ID into a URL on the basis of the ID-URL conversion table shown in FIG. 3. The content server also converts URLs into contents.

In the explanations below referring to FIG. 2A through FIG. 2D, the case will be explained in which a code transmission unit (terminal) transmits code(s) extracted from image acquired by reading printed image(s) on print media (a printed material). However, it is also possible to transmit image acquired by reading image(s) in which code(s) is/are embedded. In this case, the process of extracting the codes from the read images is performed by a conversion server on the receiving side.

First, in FIG. 2A, an image that is printed on printed matter and in which an ID is embedded is read by a terminal operated by a user. Then, the ID is extracted from the read and acquired image and the ID is transmitted to the conversion server together with the unique information used for identifying the terminal which is the transmission destination. The conversion server searches an internal database (the ID-URL conversion table in FIG. 3) by using the ID included in the information received, acquires the URL corresponding to the ID, and transmits to the content server the URL together with the identification information of the terminal to which the ID has been transmitted. The content server transmits to the terminal the content corresponding to the URL.

In FIG. 2B, the user terminal reads an image that is printed on printed matter and in which an ID is embedded. Then, the ID is extracted from the read and acquired image, and the ID is transmitted to the conversion server together with the unique information used for identifying the terminal as the transmission destination. The conversion server searches an internal database (the ID-URL conversion table in FIG. 3) by using the ID included in the information received, acquires the URL corresponding to the ID, and returns the URL to the transmission source terminal of the ID. The terminal transmits the received URL to the content server. The content server transmits to the terminal the content corresponding to the received URL.

In FIG. 2C, a user terminal 1 reads an image that is printed on printed material and in which an ID is embedded. Then, the ID is extracted from the read and acquired image, and the ID is transmitted to the conversion server together with the unique information used for identifying a terminal 2 which is the transmission destination. The conversion server searches an internal database (the ID-URL conversion table in FIG. 3) by using the ID included in the information received, acquires the URL corresponding to the ID, and transmits the URL to the content server together with the identification information of the terminal 2 of the transmission destination. The content server transmits to the terminal 2 the content corresponding to the received URL.

In FIG. 2D, the user terminal 1 reads an image that is printed on printed material and in which an ID is embedded. Then, the ID is extracted from the read and acquired image and the ID is transmitted to the conversion server together with the unique information used for identifying the terminal 2 which is the transmission destination. The conversion server searches an internal database (the ID-URL conversion table in FIG. 3) by using the ID included in the information received, acquires the URL corresponding to the ID, and transmits the URL to the terminal 2. The terminal 2 transmits the received URL to the content server. The content server transmits the content corresponding to the received URL to the terminal 2.

Via the operations described above, content corresponding to an ID is acquired from an image that is printed on a print medium and in which the ID is embedded.

It is possible to use a mobile phone having a camera as one of the terminals included in FIG. 2A through FIG. 2D. In this case, image(s) that is/are on print media and in which ID(s) is/are embedded is/are picked up by the camera included in the mobile phone operated by a user. Then, by using communication function of the mobile phone, the image(s) picked up or ID(s) extracted from the image(s) picked up is/are transmitted to the conversion server. It is also possible to display the content received from the content server on display unit of the mobile phone.

Figure 4A:
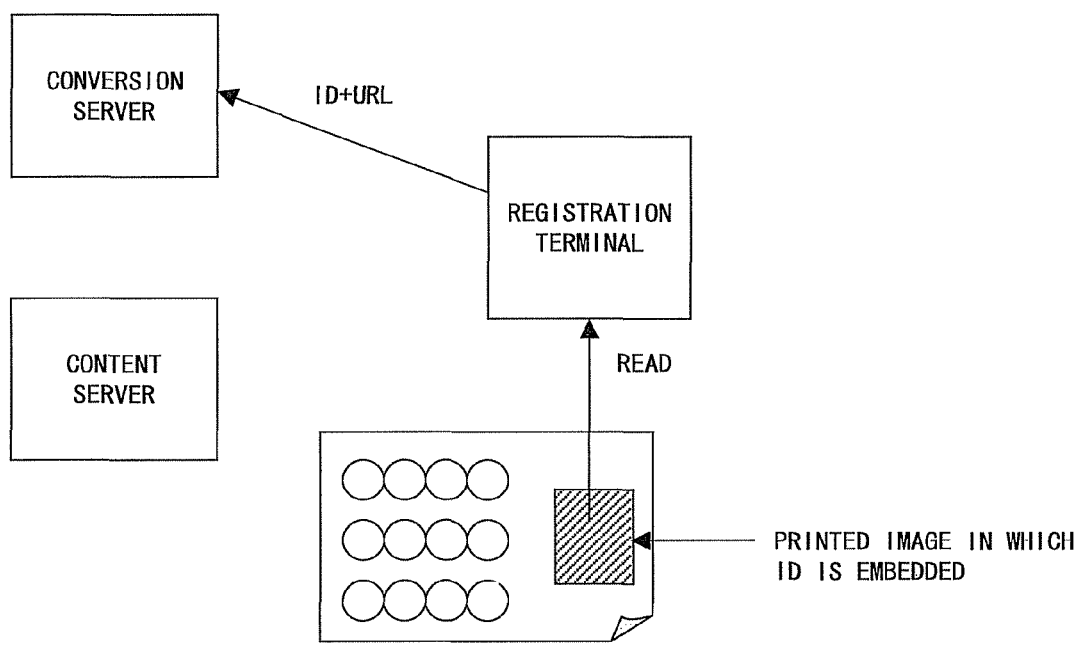
FIG. 4A is the first view showing exchanges of information between a registration terminal and the information providing unit in the case in which content corresponding to image(s) in which ID(s) is/are embedded is changed.
Figure 4B:
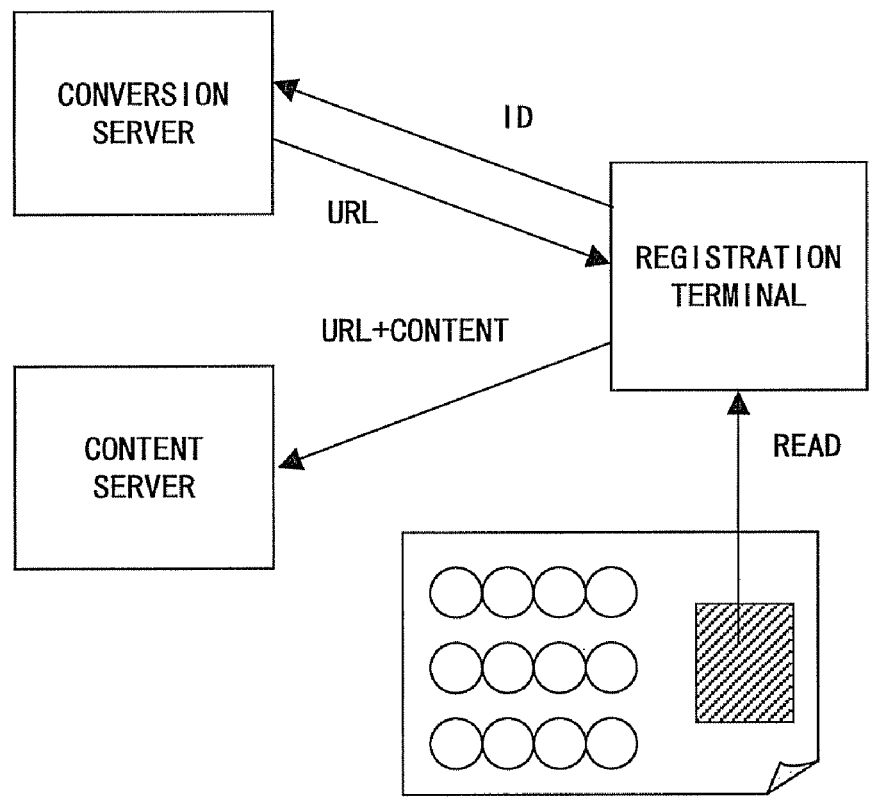
FIG. 4B is the second view showing exchanges of information between a registration terminal and the information providing unit in the case in which content corresponding to image(s) in which ID(s) is/are embedded is changed.
Figure 4C:
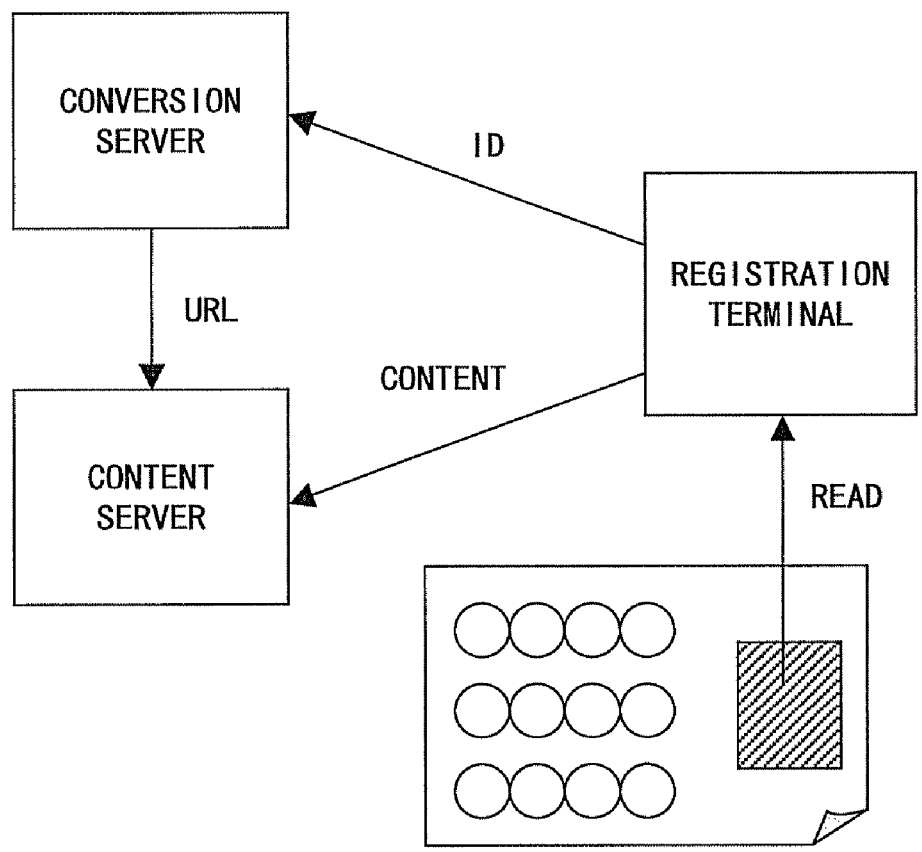
FIG. 4C is the third view showing exchanges of information between a registration terminal and the information providing unit in the case in which content corresponding to image(s) in which ID(s) is/are embedded is changed.

FIGS. 4A through 4C show exchanges of information between a registration terminal and the information providing unit in the case when content corresponding to image(s) in which ID(s) is/are embedded is changed.

In FIG. 4A and FIG. 4C, the registration terminal corresponds to the information changing unit 17 shown in FIG. 1. In FIG. 4A, the second information rewriting unit 19 in the information changing unit 17 rewrites URL(s) that is/are information used for acquiring content. In FIG. 4B and FIG. 4C, the first information rewriting unit 18 in the information changing unit 17 rewrites the content itself. The processes of changing corresponding content by using the registration terminal, which will be explained by referring to FIGS. 4A through 4C are performed independently from the above accesses from the user terminal to the information providing unit.

In FIG. 4A, the registration terminal operated by a user reads an image that is printed on printed material and in which an ID is embedded. Then, the ID is extracted from the read and acquired image, and the ID is transmitted to the conversion server together with the information (URL) used for acquiring content that is meant to be newly associated with the image (ID). The conversion server searches an internal database (the ID-URL conversion table in FIG. 3) by using the ID included in the information received, and rewrites the URL corresponding to the ID into the new URL.

The configuration is possible in FIG. 4A in which only the rewrite requests from particular registration terminals are validated on the conversion server side. In this case, the registration terminal transmits to the conversion server the ID (code) extracted from the read and acquired image that is on the print medium and in which a code is embedded, the new URL that is meant to be associated with the ID, and the identification information by which the registration terminal can be uniquely identified. The conversion server receives from the registration terminal the ID, the new URL that is meant to be associated with the ID, and the identification information, searches a list (not shown) of the terminals that are permitted to write to the conversion server, and determines whether or not the URL corresponding to the received ID in an internal database is to be rewritten into the new URL on the basis of whether or not the corresponding identification information is included in the list.

In FIG. 4B, the registration terminal operated by a user reads an image that is printed on printed material and in which an ID is embedded. Then, the ID is extracted from the read and acquired image, and the ID is transmitted to the conversion server together with the unique information used for identifying the registration terminal (the registration terminal currently operated by the user) which is the transmission destination. The conversion server searches an internal database (the ID-URL conversion table in FIG. 3) by using the ID included in the information received, acquires the URL corresponding to the ID, and transmits the URL to the registration terminal. The registration terminal transmits to the content server the received URL together with the content that is meant to be newly associated with the URL. The content server receives the URL and the content that should be associated with the URL, and rewrites the content corresponding to the URL into the new content.

The configuration is also possible in FIG. 4B in which only the rewrite requests from particular registration terminals are validated on the content server side. In this case, the registration terminal transmits to the content server the URL, the content that is meant to be newly associated with the URL, and the identification information by which the registration terminal can be uniquely identified. The content server receives from the registration terminal the URL, the new content that is meant to be associated with the URL, and the identification information by which the registration terminal can be uniquely identified, searches a list (not shown) of the terminals that are permitted to write to the content server, and determines whether or not the content corresponding to the received URL is to be rewritten into the new content on the basis of whether or not the corresponding identification information is included in the list.

In FIG. 4C, the registration terminal operated by a user reads a printed image that is printed on printed matter and in which an ID is embedded. Then, the ID is extracted from the read and acquired image, and the ID is transmitted to the conversion server together with the unique information used for identifying the registration terminal (the registration terminal currently operated by the user). The conversion server searches an internal database (the ID-URL conversion table in FIG. 3) by using the ID included in the information received, acquires the URL corresponding to the ID, and transmits to the content server the URL together with the identification information of the registration terminal. The registration terminal transmits to the content server the content that is meant to be newly associated with the printed image that is on the printed matter and in which the ID is embedded together with the identification information of the registration terminal. The content server identifies the set of the URL and the new content transmitted from the same registration terminal by using the identification information of the registration terminals that are among the received URLs and the received new content. Then, the content server rewrites into the content that is meant to be newly associated with the URL the content corresponding to the URL included in the identified pair.

The configuration is also possible in FIG. 4C in which only the rewrite requests from particular registration terminals are validated on the content server side. In this case, upon identification of the above set, the content server searches a list (not shown) of the terminals that permitted writing to the content server by using the identification information of the registration terminal, and determines whether or not the content corresponding to the received URL is to be rewritten into the new content on the basis of whether or not the corresponding identification information is included in the list.

By executing the above processes, it is possible to provide new content for printed matter having printing on it image(s) in which ID(s) that has/have already been distributed is/are embedded.

In FIG. 4A through FIG. 4C it is possible to use as one of the registration terminals a mobile phone having a camera, or a computer to which an image scanner or a camera is connected. In this case, image(s) that is/are on print media and in which ID(s) is/are embedded is/are picked up by the camera included in the mobile phone, the image scanner or the camera connected to computer operated by users. Then, by using communication function in the mobile phone or computer, the picked-up image(s) or ID(s) extracted from the picked-up image(s) is/are transmitted to the conversion server.

As described above, according to the present invention, it is possible to change content that is to be acquired by using printed images that are on print media and in which codes are embedded even after the print media are distributed. In the example of business cards, even when contact information (such as a company's name, a person's section, and the like) of a person who has distributed his/her business cards changes after the distribution, people having received the business cards can have the latest contact information because new content is provided.

Also, according to the present invention, it is possible to identify content corresponding to embedded code(s) in a simple manner because the change in the content to be provided is carried out in the registration terminal by reading image(s) on printed matter that is identical to the distributed printed matter. In the case of registration operations, for example, operators do not have to handle URLs for acquiring codes or content, and can change content using, as interfaces, image(s) that can be visually and intuitively understood.

FIG. 5 shows an example in which the information providing system according to the present invention is applied in the case in which the printed materials that are distributed are business cards.

In FIG. 5, on each business card, a photograph of the owner of the card is printed as an image in which a code is to be embedded. When the content that corresponds to the photograph (image) is to be changed, the person who has distributed the cards, i.e., the person in the photograph (image), extracts the code by picking up the photograph on the business card via a mobile phone that has a camera. Then, the extracted code, the identification information of the mobile phone, and the URL that is meant to newly correspond to the photograph (image) are transmitted to the conversion server from the mobile phone. The conversion server determines whether or not the URL should be rewritten on the basis of the received identification information. When the rewriting is permitted, the URL corresponding to the code is rewritten into the new URL.

Also, when users (people who have received the business cards) refer to the content, the user extracts the code by picking up the photograph on the business card with a mobile phone that has a camera. Then, the mobile phone transmits the code to the conversion server, and the conversion server returns the URL corresponding to the code. The user transmits the URL to the content server by using the mobile phone, then the mobile phone receives the content corresponding to the URL from the content server. The user can refer to the content on, for example, a display screen of the mobile phone.

In the above explanations, the same content is provided to user terminals for a code having a fixed value unless new content is registered. However, the provided content may vary depending on the user in response to the transmission of one and the same code by different users. In this case, a code and identification information by which the terminal can be uniquely identified are transmitted from the terminal, and the conversion server receives the code and the identification information and either the information that the terminal in FIG. 2A or terminal 2 in FIG. 2C receives, or the information that the terminal in FIG. 2B or terminal 2 in FIG. 2D can acquire can be determined, depending on that identification information. In this case, for example, a table holding URLs corresponding to combinations between codes and identification information of terminals is used instead of the table shown in FIG. 3.

Naturally, different forms are employed for outputting the content information depending on types of content information. Various forms of output are possible, including displaying the content on display units, using speaker systems for outputting the content as audio information, and the like.

What is claimed is:

1. An information providing system for receiving or acquiring information corresponding to an image in which a code is embedded by using a print medium on which the image including the code embedded therein is printed, comprising:

a code transmission unit that transmits an image acquired by reading the image that is printed on the print medium and in which the code is embedded, or the code extracted from the read and acquired image;

an information providing unit that receives the acquired image, or the code extracted from the read and acquired image, and transmits information corresponding to the image, or information used for acquiring the information corresponding to the image;

an image receiving/acquiring unit that receives the information corresponding to the image, or receives the information used for acquiring the information corresponding to the image and accordingly acquires the information corresponding to the image using the information that is used for the acquisition; and an information changing unit that changes the information corresponding to the image in the information providing unit, wherein:

the code transmission unit transmits, together with the code, identification information uniquely identifying the code transmission unit; and the information providing unit receives the code and the identification information, and, depending on the identification information, determines the information that the information receiving/acquiring unit receives or acquires.

2. The information providing system according to claim 1, wherein:

the code transmission unit and the information receiving/acquiring unit are included in one terminal.

3. An information providing system for receiving or acquiring information corresponding to an image in which a code is embedded by using a print medium on which the image including the code embedded therein is printed, comprising:

a code transmission unit that transmits an image acquired by reading the image that is printed on the print medium and in which the code is embedded, or the code extracted from the read and acquired image;

an information providing unit that receives the acquired image, or the code extracted from the read and acquired image, and transmits information corresponding to the image, or information used for acquiring the information corresponding to the image;

an image receiving/acquiring unit that receives the information corresponding to the image, or receives the information used for acquiring the information corresponding to the image and accordingly acquires the information corresponding to the image using the information that is used for the acquisition; and an information changing unit that changes the information corresponding to the image in the information providing unit, wherein:

the information changing unit transmits, to the information providing unit, the code extracted from the image acquired by reading the image that is printed on the print medium and in which the code is embedded, and the identification information uniquely identifying the information changing unit; and the information providing unit receives the code and the identification information from the information changing unit, and determines whether or not information corresponding to the image specified by the information changing unit is to be changed by using the code and the identification information.

4. The information providing system according to claim 3, wherein:

the information changing unit can rewrite the information corresponding to the image stored in the information providing unit.

5. The information providing system according to claim 3, wherein:

the information changing unit can rewrite the information used for acquiring information corresponding to the image stored in the information providing unit.

6. The information providing system according to claim 3, wherein:

the code transmission unit and the information receiving/acquiring unit are included in one terminal.

* * * * *